US011121993B2

(12) United States Patent
Chilakamarri et al.

(10) Patent No.: US 11,121,993 B2
(45) Date of Patent: Sep. 14, 2021

(54) DRIVING CONTEXTUALLY-AWARE USER COLLABORATION BASED ON USER INSIGHTS

(71) Applicant: MICROSOFT TECHNOLOGY LICENSING, LLC, Redmond, WA (US)

(72) Inventors: Venkat Pradeep Chilakamarri, Seattle, WA (US); John Hoegger, Woodinville, WA (US); Rui Hu, Redmond, WA (US); Jill Kathleen Larson, Bellevue, WA (US); Manya Garg, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 15/958,891

(22) Filed: Apr. 20, 2018

(65) Prior Publication Data
US 2019/0288968 A1      Sep. 19, 2019

Related U.S. Application Data

(60) Provisional application No. 62/643,094, filed on Mar. 14, 2018.

(51) Int. Cl.
*H04L 12/58* (2006.01)
*H04L 29/08* (2006.01)
(Continued)

(52) U.S. Cl.
CPC .......... *H04L 51/08* (2013.01); *G06F 16/176* (2019.01); *G06Q 10/10* (2013.01);
(Continued)

(58) Field of Classification Search
CPC ..... H04L 51/08; H04L 65/1069; H04L 67/06; H04L 67/109; H04L 67/1097; G06F 16/176; G06Q 10/10
See application file for complete search history.

(56) References Cited

U.S. PATENT DOCUMENTS

| 2003/0105816 | A1* | 6/2003 | Goswami | G06Q 10/10 709/204 |
| 2007/0112913 | A1* | 5/2007 | Bales | G06Q 10/10 709/204 |

(Continued)

OTHER PUBLICATIONS

"International Search Report and Written Opinion Issued in PCT Application No. PCT/US19/020864", dated Apr. 23, 2019, 14 Pages.

*Primary Examiner* — Christopher B Robinson
(74) *Attorney, Agent, or Firm* — Newport IP, LLC; Michael C. Johnson

(57) ABSTRACT

The techniques disclosed herein enable a system to drive collaboration between users by analyzing user interactions with productivity applications. The system provides intelligence mechanisms that work in concert with telemetry mechanisms to create interactive experiences that encourage users to embrace technology, improve productivity, and increase collaboration. In some configurations, the system can drive collaboration between users by correlating signals that define user interactions with individual productivity applications with contextual data that indicates how time has been allocated. During, or upon completion of a group activity, the system can identify individuals of interest and enable a user to readily share relevant files with the identified individuals.

20 Claims, 11 Drawing Sheets

(51) Int. Cl.
*H04L 29/06* (2006.01)
*G06F 16/176* (2019.01)
*G06Q 10/10* (2012.01)

(52) U.S. Cl.
CPC .......... H04L 65/1069 (2013.01); H04L 67/06 (2013.01); H04L 67/1097 (2013.01)

(56) References Cited

U.S. PATENT DOCUMENTS

| | | | |
|---|---|---|---|
| 2007/0294350 A1* | 12/2007 | Kumar | H04L 67/14 709/205 |
| 2012/0284357 A1* | 11/2012 | Meisels | H04L 67/2852 709/217 |
| 2013/0060594 A1* | 3/2013 | Motoyama | G06Q 10/1097 705/7.21 |
| 2014/0129725 A1* | 5/2014 | Junqua | H04L 65/403 709/227 |
| 2014/0372162 A1 | 12/2014 | Dhara et al. | |
| 2015/0112749 A1* | 4/2015 | Erdal | G06F 3/04842 705/7.19 |
| 2016/0179863 A1* | 6/2016 | Chandran | G06Q 10/0637 707/751 |
| 2016/0212138 A1 | 7/2016 | Lehane | |
| 2017/0083871 A1 | 3/2017 | Chang et al. | |
| 2017/0286448 A1* | 10/2017 | Hanes | G06F 16/178 |
| 2018/0011848 A1* | 1/2018 | Spataro | G06F 16/93 |
| 2019/0364246 A1* | 11/2019 | Krizan | H04R 1/028 |

* cited by examiner

DRIVING CONTEXTUALLY-AWARE USER COLLABORATION BASED ON USER INSIGHTS

CROSS-REFERENCE TO RELATED APPLICATIONS

This application claims priority under 35 U.S.C. § 119(e) to U.S. Provisional Patent Application No. 62/643,094, filed on Mar. 14, 2018 and titled "Driving Contextually-Aware User Collaboration Based on User Insights," the entire disclosure of which is expressly incorporated in its entirety by reference herein.

BACKGROUND

In many productivity applications, such as Excel, OneNote, Pages, Numbers, Google Docs, and Google Sheets, each application has specialized tools for enabling users to view, display, and manipulate files. Although such applications can help users in many ways, some existing productivity applications do not provide tools that influence users to collaborate with others. In addition, some existing systems do not recognize or acknowledge the impact a user and their work may have on others. With an ongoing need to improve efficiencies within a work environment, there is also an ongoing need to develop tools and application features that assist users in identifying how their work may impact collaborators and consumers.

SUMMARY

The techniques disclosed herein enable a system to drive collaboration between users by analyzing user interactions with productivity applications. The system provides intelligence mechanisms that work in concert with telemetry mechanisms to create interactive experiences that encourage users to embrace technology, improve productivity, and increase collaboration. As will be described in more detail below, the techniques disclosed herein enable a system to provide file sharing notifications and file sharing tools that are optimized to coordinate with a workflow of a group of users. Files and recommendations can be shared with individuals participating in a group activity in a way that helps each user expand and increase their impact. In addition, the system is able to piece together various elements of each user's experience in the right context of each user's workflow. Based on such an analysis, the system can provide contextually aware suggestions and/or automated actions at the right time to drive efficient, collaborative behaviors.

In some configurations, the system can drive collaboration between users by correlating signals that define user interactions with individual productivity applications with contextual data that indicates how time has been allocated with respect to one or more workflows. The signals can come from applications that analyze any type of activity performed by a group of individuals. Group activities can include, but are not limited to, a presentation of a file to a group of individuals, a multi-user editing session of a file, sharing a view of a file on a video conference, sharing a view of a file on an external monitor or projector, etc. During, or upon completion of the group activity, the system can identify individuals of interest using calendaring data or any other data defining an event, and provide tools enabling a user to readily share relevant files with the identified individuals.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
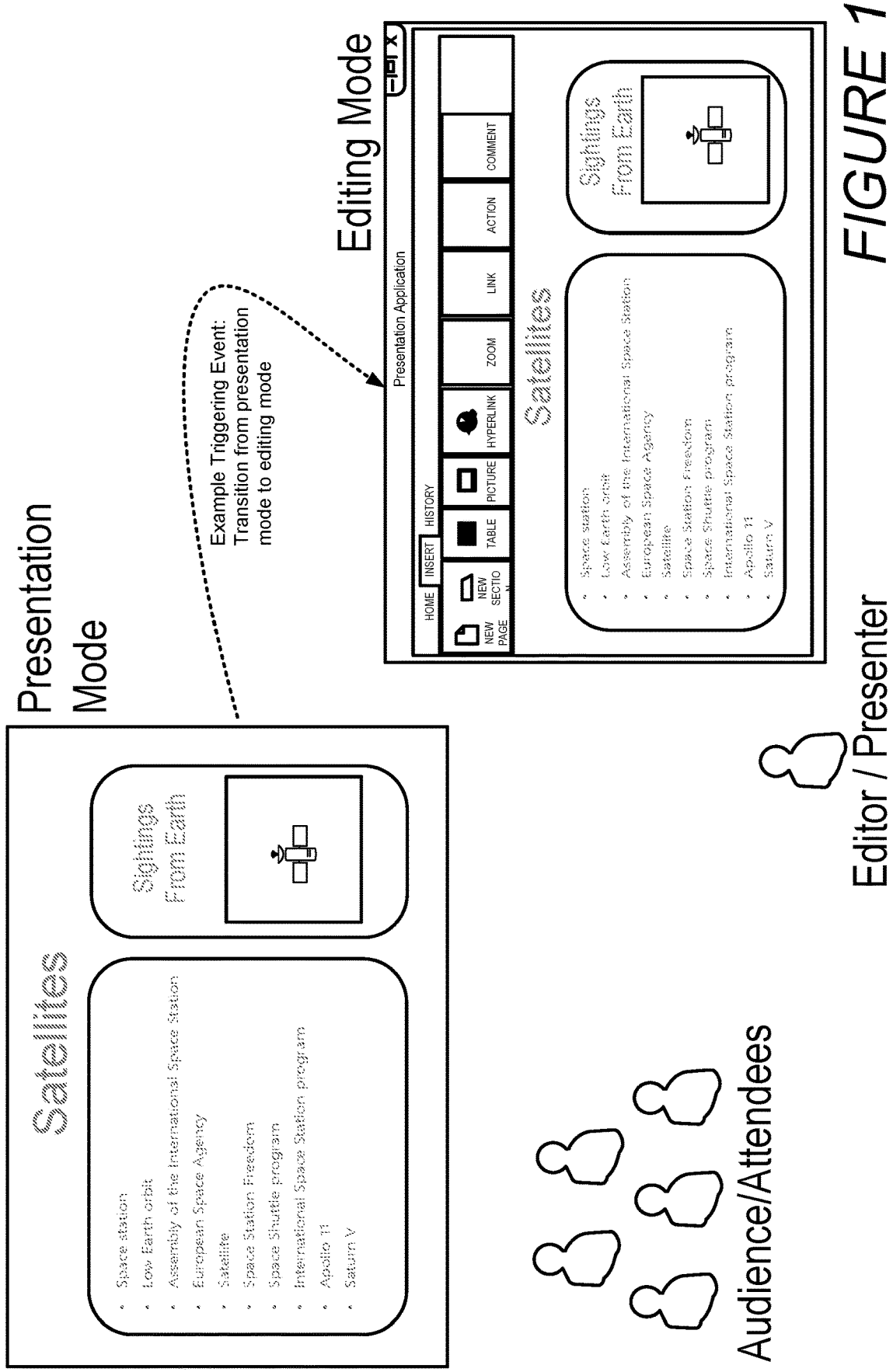
FIG. 1 is a diagram illustrating an example scenario utilizing a system for driving collaboration between users by analyzing user interactions with productivity applications.

The techniques disclosed herein enable a system to drive collaboration between users by analyzing user interactions with productivity applications. The system provides intelligence mechanisms that work in concert with telemetry mechanisms to create interactive experiences that encourage users to embrace technology, improve productivity, and increase collaboration. As will be described in more detail below, the techniques disclosed herein enable a system to provide file sharing notifications and file sharing tools that are optimized to coordinate with a workflow of a group of users. Files and recommendations can be shared with individuals participating in a group activity in a way that helps each user expand and increase their impact. In addition, the system is able to piece together various elements of each user's experience in the right context of each user's workflow. Based on such an analysis, the system can provide contextually aware suggestions and/or automated actions at the right time to drive efficient, collaborative behaviors.

In some configurations, the system can drive collaboration between users by correlating signals that define user interactions with individual productivity applications with contextual data that indicates how time has been allocated with respect to one or more workflows. The signals can come from applications that analyze any type of activity performed by a group of individuals. Group activities can include, but are not limited to, a presentation of a file to a group of individuals, a multi-user editing session of a file, sharing a view of a file on a video conference, sharing a view of a file on an external monitor or projector, etc. During, or upon completion of the group activity, the system can identify individuals of interest using calendaring data or any other data defining an event, and provide tools enabling a user to readily share relevant files with the identified individuals.

In one illustrative example, a user may present the contents of a file using a presentation application. The system can detect a triggering event, such as a transition of the application from a presentation mode to an editing mode. The system can then identify individuals of interest by accessing the calendar of the presenter and identifying invitees or attendees listed in a calendar event. The system can then generate a message with an attachment of the file or a link to the file. The system can also automatically populate the message with email addresses of the attendees. The message can be generated as part of an in-application feature of the presentation application or the message can be provided in a separate application such as an email application.

The individuals of interest may be identified by a number of techniques including, but not limited to, analysis of calendar data, location data, or any other contextual data. Based on one or more factors, such as a time of a presentation, a time a file was edited, a time of a calendar event, a location of the user, or a time of a communication session of one or more users, a system can identify the individuals of interest. In one example, computer users that have a common calendar event with a presenter of a file can be identified as individuals of interest. Other factors may also be considered, such as whether a user has accepted a particular calendar event. Such factors can be processed with other contextual information such as a user's location at the time of the group activity, e.g., a presentation, etc. Users that are co-located at a time of a group activity can be identified as individuals of interest.

With reference to FIG. 1, consider an example scenario where a first user invites several individuals to a meeting. During that meeting, the first user presents the contents of a file to the meeting attendees. The application used to present the contents of the file is configured to detect a mode change, e.g., a triggering event, and take one more actions in response to the mode change. For instance, when the presentation application transitions to an editing mode from a presentation mode, the application can assist the first user in delivering the file to the attendees of the meeting.

The application and/or other software components in communication with the application (collectively referred to herein as a "system") can identify the attendees of the meeting in a number of ways. In one embodiment, the system can obtain information from a calendaring system. The system may examine a time of the triggering event, e.g., when the presentation application transitions to, or from, the presentation mode, and identify a calendar event that overlapped with the time of the triggering event. The system can then identify the users who are associated with a calendar event, e.g., users that were invited to the meeting. For illustrative purposes, the terms "invitee" and "attendee" are both referred to herein as an individual that is named or referenced in a calendar event.

Figure 2:
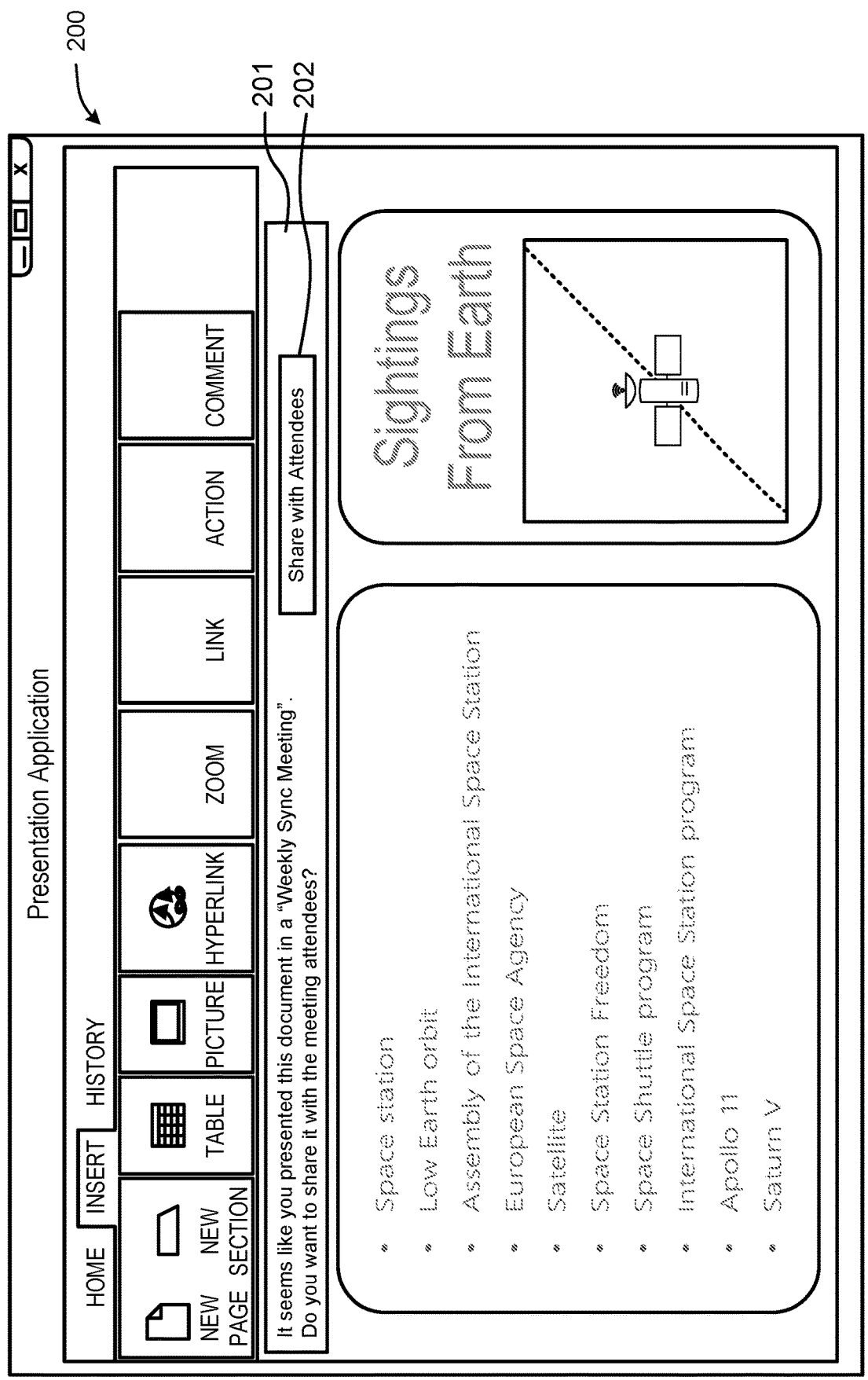
FIG. 2 is a screenshot showing an example notification that is in the form of a message displayed on a user interface of an presentation application.

In response to the triggering event, the system can automatically generate a notification to the presenter asking the presenter if they would like to deliver the presented file to the identified users. One example of a notification is illustrated in FIG. 2. In this example, the notification is in the form of a message displayed on a user interface 200 of the presentation application. In this example, a text notification 201 is displayed. In addition, the user interface 200 may include a selectable element 202 enabling the user to easily share the file to the identified users by interacting directly from the presentation application. This example is provided for illustrative purposes and is not to be construed as limiting. The notification can be in any format, including a generated voice notification, an instant message, an email, etc.

Figure 3:
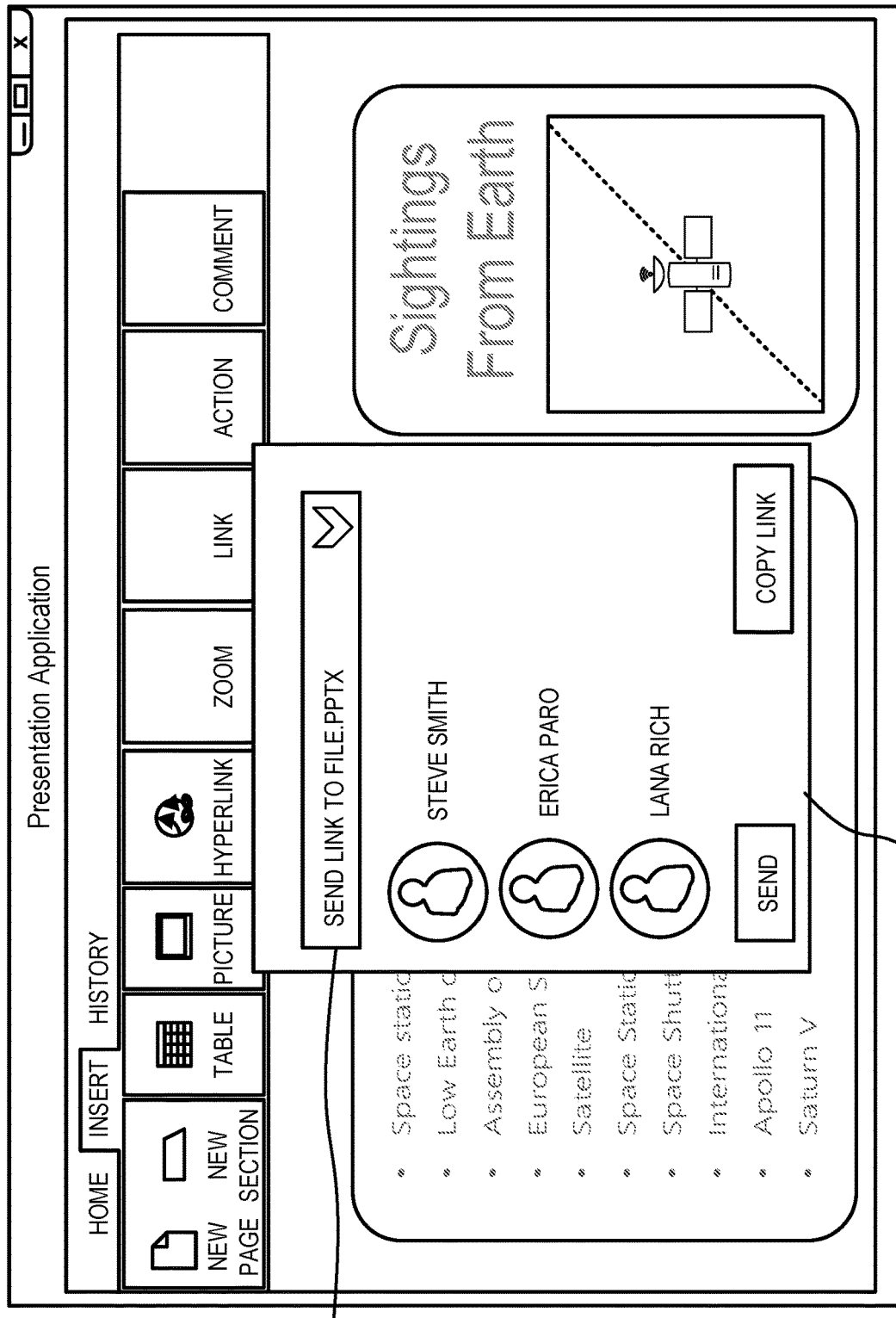
FIG. 3 illustrates an example of an in-application interface providing a pre-populated list of recipients and a link to a file to be shared.

As shown in FIG. 3, in response to the user's interaction with the notification, the system may display a message 203. The message 203 may be in the form of an in-application message providing a pre-populated list of recipients and a link to the presentation file. The recipients can be populated into a recipient field based on the individuals identified the calendaring event. The message 203 can also have a menu 204 that allows a user to select different delivery methods. For instance, a default option can include a link to the file. By the use of the menu 204, the user can select other delivery options, which may involve attaching a copy of the file to the message. The message 203 can include a selectable interface element for sending the message, e.g., a "send" button, and another selectable interface element for other functions, such as a "copy link" button. In some alternative embodiments, instead of displaying the notification and/or the message 203, the system can automatically deliver the file to the identified individuals in response to the triggering event.

Figure 4:
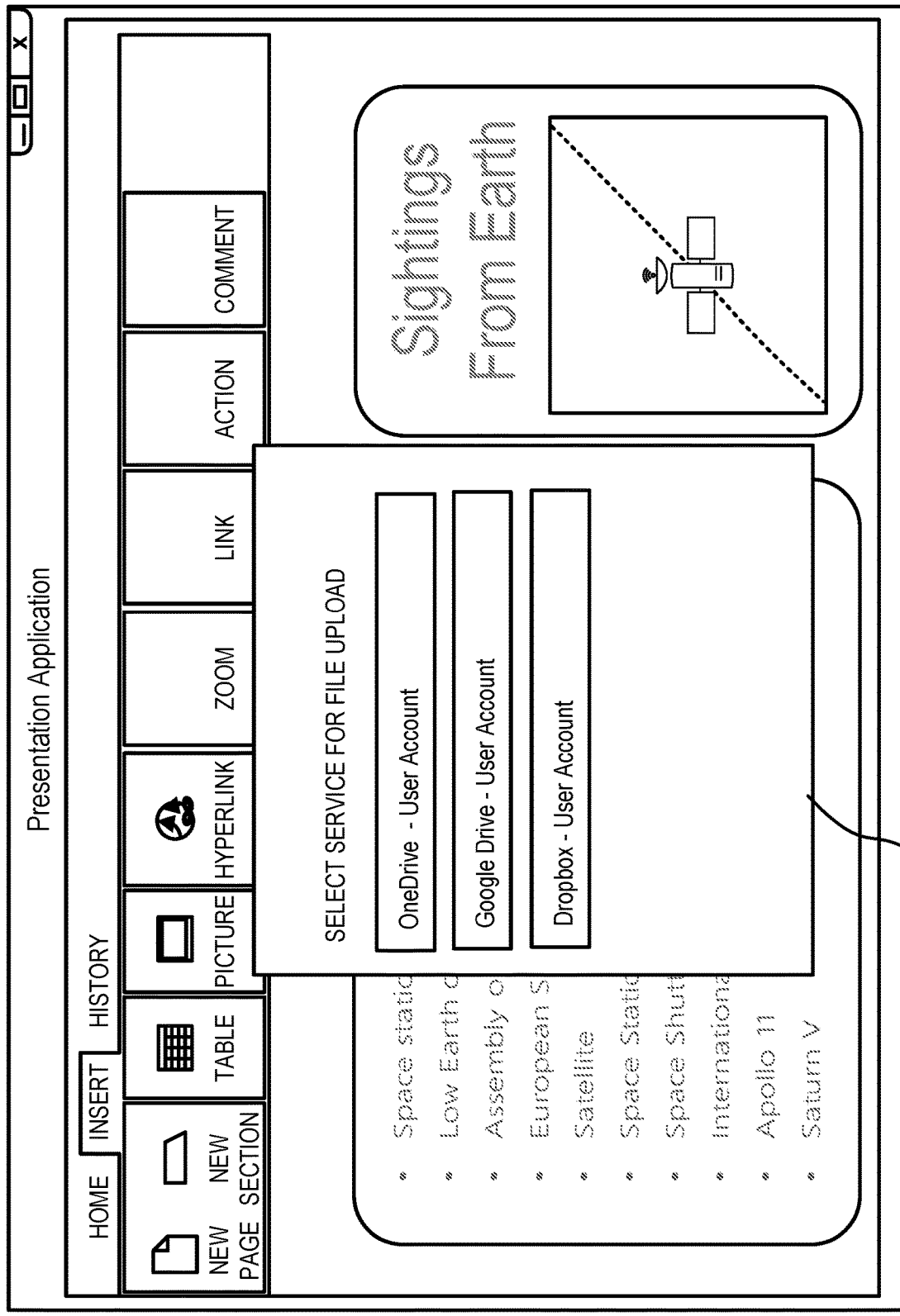
FIG. 4 illustrates an example of an in-application interface providing tools for uploading files to one or more remote storage services.

The system is also configured to determine if a file is stored on a local hard drive of the presenter's computer. The system can also determine if the file is not stored on a shareable platform, such as OneDrive, Dropbox, etc. When the system detects that a file is only stored locally, and not stored on a shareable platform, the system may assist the user in uploading the file. In one embodiment, as shown in FIG. 4, the system can cause the display of an upload user interface 210 prompting the user to select a storage service and/or a storage account. Upon selection of a storage service, the system may upload the file to the service. Once the file is uploaded, the system may display the message 203 shown in FIG. 3 to allow the user to readily share a link to the uploaded file.

Aspects of the present disclosure provide a number of technical benefits. For instance, the system influences users to have greater follow-through at the conclusion of the meeting. By sharing relevant files in response to an identified triggering event, the system maximizes the value of the meeting time for each person by increasing the probability that follow-through will occur. Influencing follow-through helps continue the momentum that was created in the meeting. The system can also help the effectiveness of a meeting by delivering files to people who were invited to a meeting but could not attend.

In yet another example of a technical benefit, the system can help guide users to share the information in the most optimal way. In some existing scenarios, presenters may not share a file after a presentation. And, even when a presenter shares a file, the file may be shared as an attachment to an email. The techniques disclosed herein can influence how the file is shared with other users. For instance, in the above-described scenario where a file is only stored locally on a user's computer, the system can automatically upload the presentation file to a remote storage service, such as Dropbox, Google Drive, or OneDrive, allowing the user to skip the cumbersome steps of locating the file and starting an upload.

In some configurations, a computing device can determine that the file that is stored locally on the computing device differs than a version of the file stored at a remote storage service, which can also mean that there is a local copy and that there is no remote copy stored on the remote storage service. And in response to determining that the file is stored on the computing device differs than the version of the file stored at the remote storage service, the computing system can upload the file to the remote storage service.

As also described herein, the system enables the user to easily share a link to the file without having to identify the individuals of interest and locate their contact information. Such an embodiment may influence a presenter to share the file using a delivery mechanism that promotes collaboration around the file, e.g., influence the use of a system that allows the users to jointly edit a document instead of creating a number of "dead files" delivered as attachments, which ultimately reside in each person's local computer. By influencing a user to share a file using a link, the system can reduce the usage of storage space for a number of computers, including an email server. Thus, the system can help maximize the follow-through and the return on investment (ROI) of a meeting while also minimizing the IT footprint of the meeting.

Although the examples disclosed herein involve a presentation file using a presentation application, these examples are provided for illustrative purposes and is not to be construed as limiting. A file that is presented and shared between users can be in any format. For instance, a file that is shared between users can be a word processing document, a spreadsheet document, an image file, etc. In addition, although the example above involves a transition of a presentation application as a triggering event, the techniques disclosed herein may also involve other types of triggering events. For instance, multiple users can be part of a communication session where they are all simultaneously editing a document, image file, spreadsheet, etc. Once the communication session ends or meets some other criteria, which can be any suitable triggering event, one or more users may receive a notification to share the file.

Figure 5:
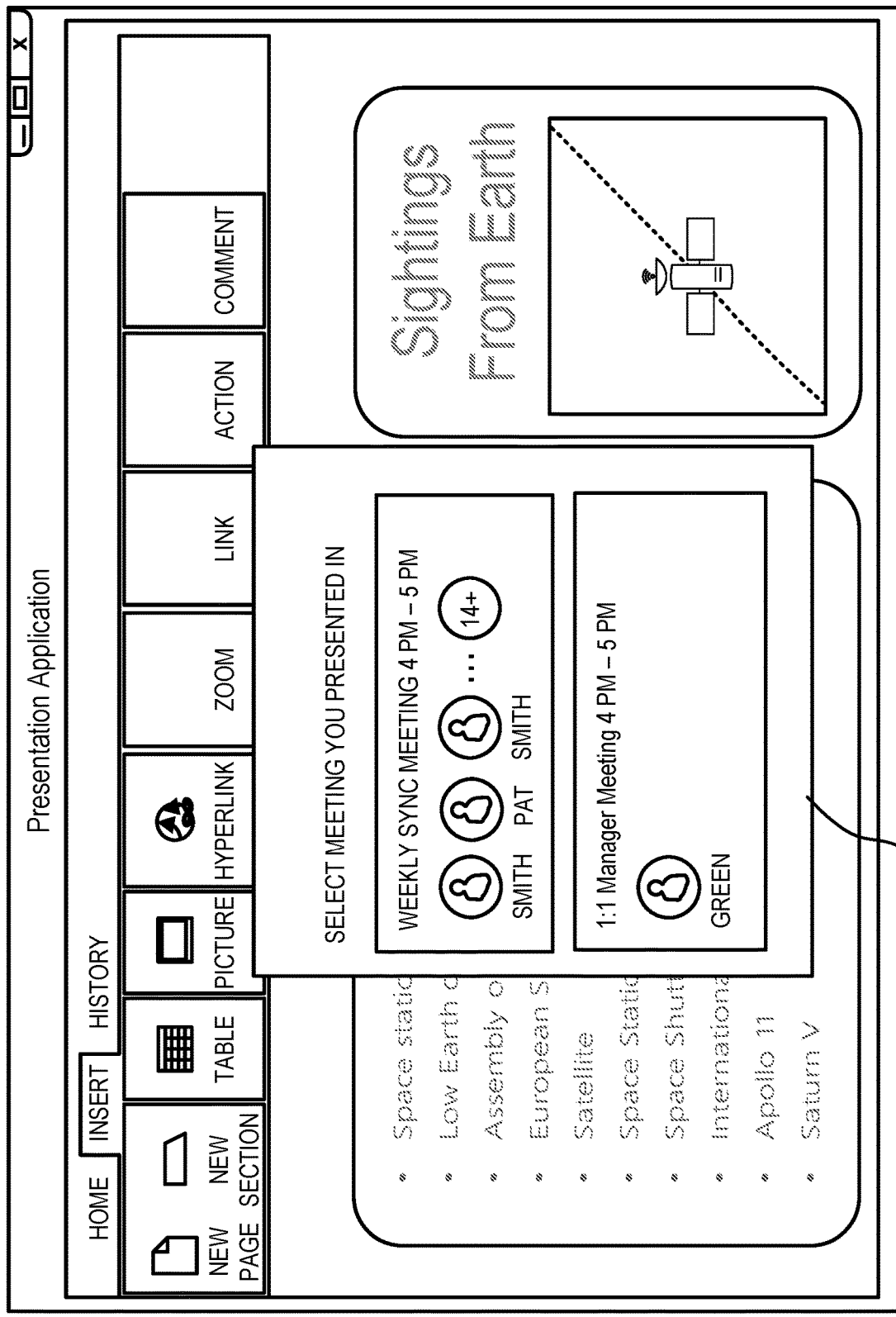
FIG. 5 illustrates an example of an in-application interface providing tools for resolving situations where multiple event candidates are discovered.

Turning now to FIG. 5, other techniques for identifying individuals of interest are shown and described below. For illustrative purposes, consider an example where the system detects multiple calendar events (also referred to herein as a "meeting candidate") that overlap with the time of a triggering event, such as a presentation of a file. In such an event, a system assists the user in selecting the most appropriate meeting. As shown in FIG. 5, when multiple meeting candidates are discovered, a user interface 501 having a list of the meeting candidates is displayed to the presenter. Other contextual data can also be displayed in the interface 501. For instance, a time and date of the triggering event, e.g., the presentation, may be displayed. In addition, a list of attendees and/or invitees of each meeting can also be displayed. One or more graphical elements, e.g., an icon, indicating the number of attendees can also be displayed. Although calendar events are used in this example, any event, such as a communication session, a multi-user edit session, or any other event involving collaboration of a file with multiple users can be used with the techniques disclosed herein.

The user interface 501 is configured to allow the user to select one of the meetings. In response to the user selection, the contact information for individuals listed as attendees or invitees in the selected meeting can be retrieved from a calendar database, and the system may display the message 203 shown in FIG. 3 to allow the user to readily share a link to the file, or an attachment of the file, with the identified individuals.

In some configurations, the system can generate confidence score with respect to each meeting candidate and correspondingly rank the meeting candidates according to the confidence score. For instance, if there are two calendar events that overlap with the time of a presentation, analysis may be conducted on the calendar events and/or the file to determine a confidence score for each calendar event. The confidence score may be based on one or more factors, such as the number of attendees in a meeting, the roles associated with the attendees, whether individuals accepted a particular meeting request, whether the subject matter of the presented file relates to the context of the meeting, etc.

For illustrative purposes, consider the scenario where a first meeting is a SYNC Meeting with 14+ invitees, and a second meeting is a 1:1 manager meeting with two invitees. In such a scenario, the first meeting may have a higher confidence score because it is more likely that the user presented the file in a meeting that had a larger audience. In addition, the system may analyze the text of the meeting, e.g., the calendar event, to determine the nature of a meeting and/or the contents of the file to determine if the meeting and the file relate. In this example, the confidence score of the second meeting may be lower than the first meeting because of the nature of the second meeting, e.g., a manager meeting can indicate that a meeting is related to individual performance, performance feedback, etc. Also, in this example, the system may analyze the context of the presentation file, and if the content of the file is related to a project of the team, and not related to performance and performance feedback, the first meeting may have a higher confidence score. As shown in the example of FIG. 5, the meetings can be listed according to the confidence score.

The system can also identify individuals of interest, select calendar events, and/or rank calendar events based on an analysis of other contextual data, such as a user's location data. In continuing the above example, consider a scenario where the user's calendar data indicates that the SYNC meeting is located in Redmond and the 1:1 manager meeting is located in Seattle. Based on analysis of location data retrieved from the user's mobile device, the system would give the SYNC meeting a higher confidence score than the 1:1 manager meeting if the location data indicates that the user was located in Redmond at the time of the meeting. Thus, in such a scenario, in the user interface 501, the SYNC meeting would be listed higher than the 1:1 manager meeting.

Conversely, if the user's location data indicated that the user was located in Seattle at the time of the meeting, the system would give the 1:1 manager meeting a higher confidence score. In such a scenario, in the user interface 501, the 1:1 manager meeting would be listed higher than the SYNC meeting.

Any other type of user activity can also be analyzed to identify individuals of interest, select calendar events and/or rank calendar events. For instance, in the above example, if there is a Skype link in each of the calendar events, and the system detects that the presenter had logged into the skype link of the SYNC meeting, the sync meeting may have a higher confidence score than the 1:1 manager meeting.

Yet further, the system can also analyze the streams of a particular communication session to identify individuals of interest, select calendar events, and/or rank calendar events. Thus, if voice communication, text messages, or any other stream data indicates that a user is attending the SYNC meeting or the manager meeting, such data can be used to generate a confidence score for a related calendar event. Patterns of one or more meetings can also be utilized to identify individuals of interest, select calendar events, and/or rank calendar events. For instance, if the manager meeting is on the user's calendar every week, and the SYNC meeting is a one-time event, the system may allocate a lower confidence score to the manager meeting.

The system can also use data defining user activity to improve results over time with utilization of one or more machine learning algorithms. According to some configurations, the system can monitor user selection of meetings and also monitor the activities of meeting participants to improve the way the system identifies individuals of interest, selects calendar events and/or ranks calendar events. For example, a linear regression mechanism may be used by the system to generate a confidence score of a calendar event or identify individuals of interest. Linear regression may refer to a process for modeling the relationship between one variable with one or more other variables. Different linear regression models might be used to generate a confidence score of a calendar event or identify individuals of interest. In addition, a least squares approach might be utilized, a maximum-likelihood estimation might be utilized, or another approach might be utilized. The linear models may be simple linear models (e.g., a single predictor variable and a single scalar response variable) or may be multiple regression models (e.g., multiple predictors). The models might also be general linear models, heteroscedastic models, generalized linear models (e.g., Poisson regression, logistic regression, or multinomial logistic regression), Bayesian linear regression, quantile regression, and the like.

Figure 6:
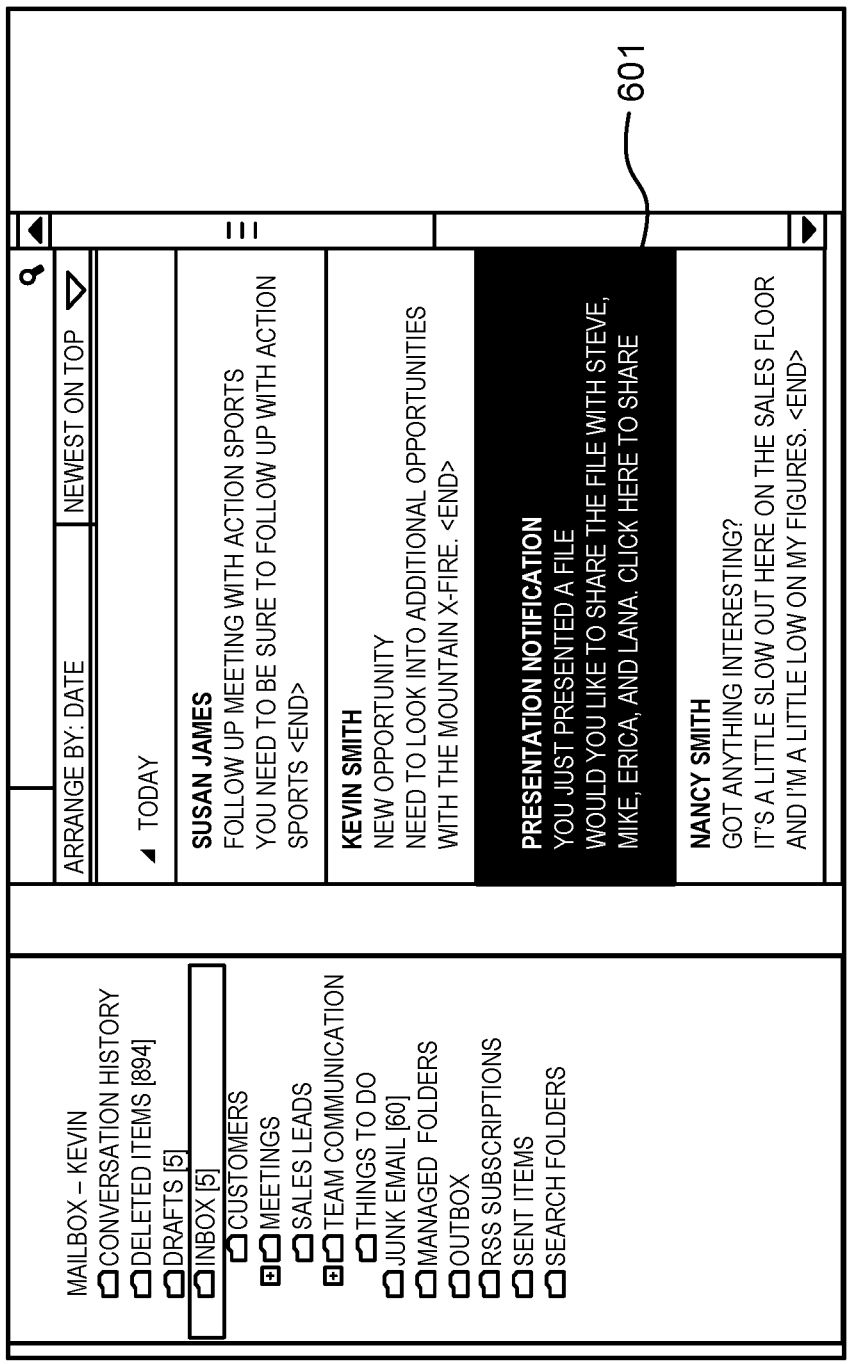
FIG. 6 illustrates another example of an interface providing a notification to share a file via an email application.

In addition to the message 203 shown in FIG. 3, the system can prompt the user to share a file using other mechanisms. For instance, as shown in FIG. 6, in response to detecting a triggering event, the system can generate an email 601. The email 601 can be delivered to the presenter to provide a reminder to share a recently presented file. The email 601 can identify the meeting attendees and provide a mechanism allowing the user to easily deliver an attachment of the file or a link to the file. For instance, the email may include embedded markup language that displays a "share" button to the user, enabling the user to easily share the file with a number of recommended recipients by actuating the button.

In some configurations, the system may provide customized notifications to the recipients of the file. For example, when the presenter sends a link or an attachment of a file, the system can check to see if the recipient has already accessed or viewed the file. If the message recipient already has the file, a customized message may be sent to that recipient. Instead of sending an attachment or link to that user, the system may customize the message to draw the recipient's attention to the file that is stored on the recipient's computer or storage service. For instance, the recipient may receive an email, an instant message, and/or a voice message, to remind the user of the presentation and also remind the user where the file is stored.

Figure 7:
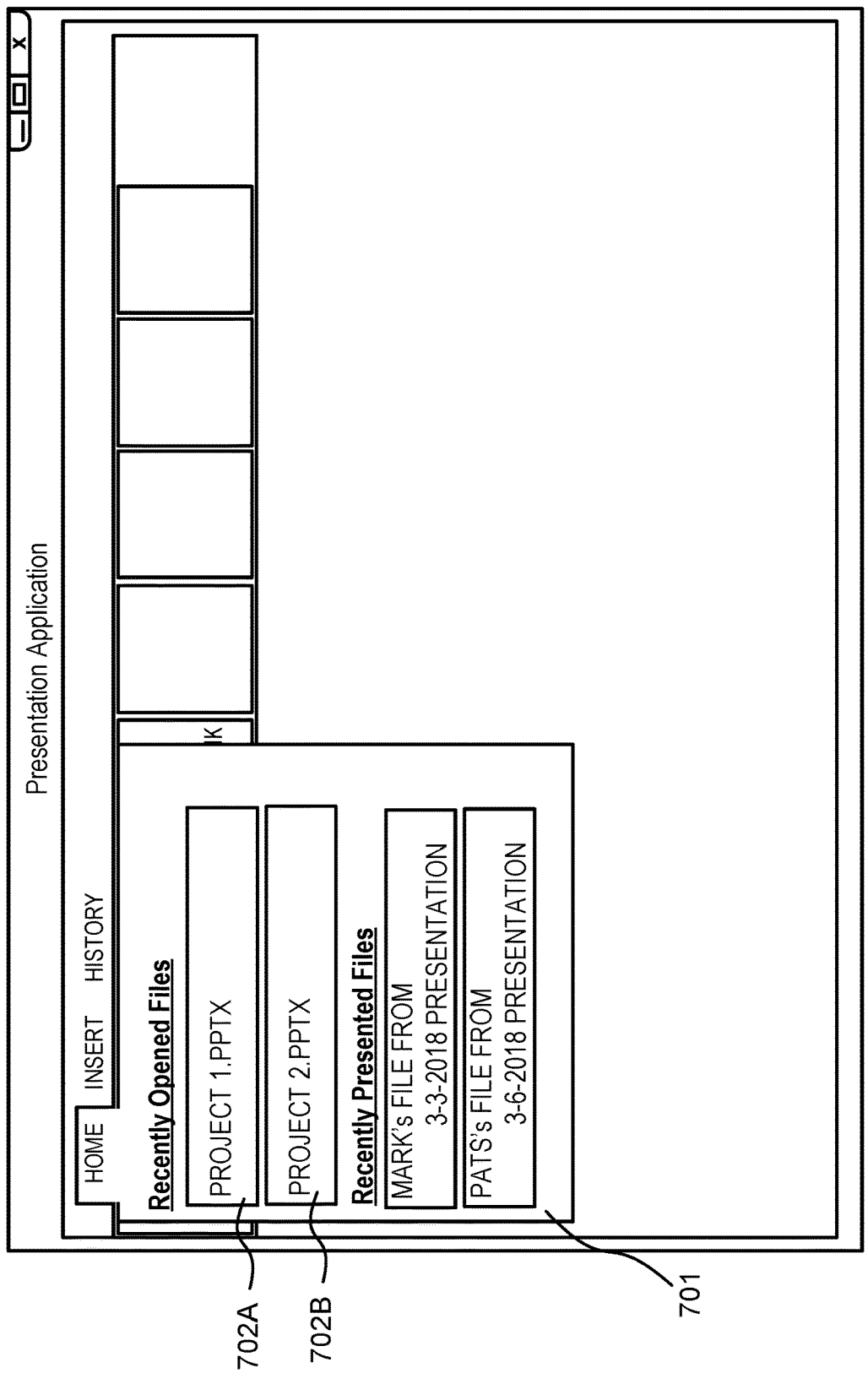
FIG. 7 illustrates an example of an in-application message that is to be viewed by a recipient of the shared document.

In addition to sending a message to each recipient, the system can also update one or more lists, such as the "Recently Presented List" (a "list 701") shown in FIG. 7. This example is provided for illustrative purposes and is not to be construed as limiting. One objective of the present disclosure is to allow a user to view a list 701 of files that were recently presented to them, and provide that list 701 in a manner that is easy to access. Thus, such lists 701 can be displayed within any type of application or a component of an operating system. In such an embodiment, a file can be automatically stored in a storage device or storage service associated with a recipient of a shared file. For instance, when a recipient is identified, a file can be copied to a OneDrive or Google Drive service associated with the recipient. The file can also be copied to a local drive of a client device managed by the recipient. A link to the copied file can be generated and associated with items 702 (individually referred to as a first item 702A and a second item 702B) of the list 701. The item 702 of the list 701 can be configured to open the shared file in response to a user selection of at least one of the items 702.

The system can also determine if permissions of a file are given to a recipient. If permissions are not granted to a recipient of a message, the system may modify the permissions of a presented file to grant access to one or more individuals of interest. In some configurations, access permissions of a file may be granted to any individual of interest in response to the detection of a triggering event.

The system can also operate with any type of file and any type of triggering event. For example, a number of users may collaborate on a word processing document that is displayed on a projector. In such a scenario, the system can detect that the document is being presented to others by the detection of an ancillary display device such as an external monitor, projector, etc. A triggering event may be detected when the ancillary display device is deactivated or when the application is closed. The sharing mechanisms disclosed herein can be utilized in response to the detection of such triggering events. In addition to, or as an alternative to, a calendar event, the techniques disclosed herein can use any type of event to identify individuals of interest. For instance, an event can be a conference session or communication session, such as a Skype call or Instant Message Chat. As also summarized above, an event may also include a multi-edit document session. An event may also include a series of actions. For example, an event can include collaboration activity around a file. For instance, an event can include a first user emailing a document to a second user, having the second user edit the document and then send the document back to the first user. Users that are involved with such an event can be identified and their contact information can be collected to generate a message or anther delivery mechanism for sharing a file.

It should be appreciated that the subject matter described herein may be implemented as a computer-controlled apparatus, a computer process, a computing system, or as an article of manufacture such as a computer-readable storage medium. Among many other benefits, the techniques shown herein improve efficiencies with respect to a wide range of computing resources. For instance, human interaction with a device may be improved, as the use of the techniques disclosed herein enable a user to share a document with minimal input to a computing device. By identifying the users and determining contact information for users that should receive a shared link or an attachment, the techniques disclosed herein can reduce the number of misdirected messages that are used to communicate shared documents. By reducing the number of misdirected communications of shared documents, and thus also reducing the messages and communications for correcting such errors, the systems disclosed herein can reduce network traffic, reduce the use of storage resources, and reduce the use of computational cycles. In embodiments where links are used, the system can influence users to send document links instead of attachments. By sharing links in response to certain events, systems disclosed herein can greatly reduce network and storage resources by influencing users to share links to documents instead of attachments.

Figure 8:
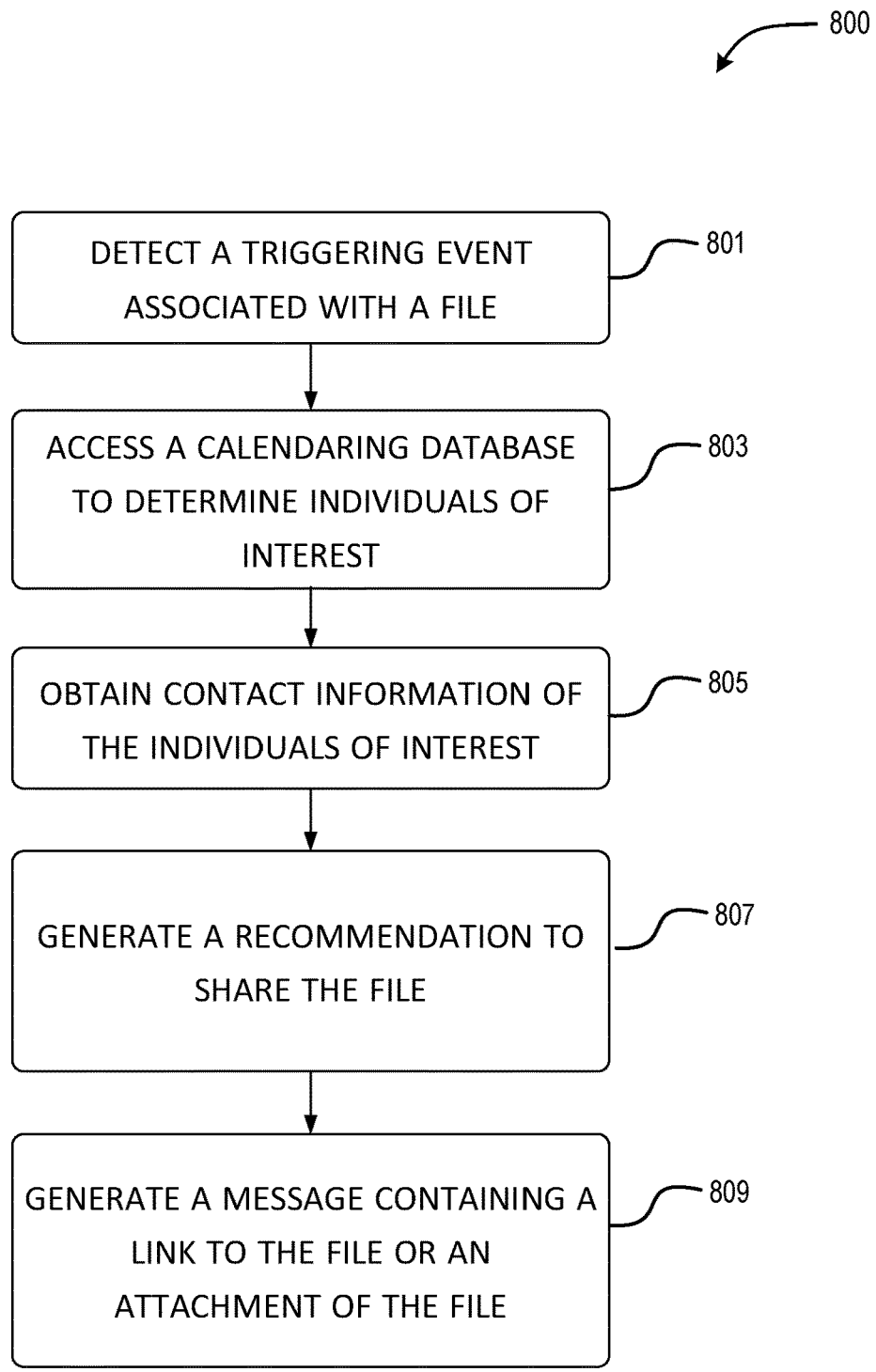
FIG. 8 is a flow diagram showing aspects of a routine for enabling the techniques disclosed herein.

Turning now to FIG. 8, aspects of a routine 800 for enabling the techniques disclosed herein are shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 800 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 800 may be also implemented in many other ways. For example, the routine 800 may be implemented, at least in part, by a processor of another remote computer or a local circuit. In addition, one or more of the operations of the routine 800 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 8, the routine 800 begins at operation 801 where one or more modules of a computing system detect a triggering event associated with a file. As summarized above, a triggering event can involve any user activity associated with a presentation of a file. For instance, a triggering event can include a transition of an application from one mode to another, e.g., a transition from presentation mode to editing mode. A triggering event can include any type of activity where a screen is shared, contents of a file is shared over a communication session, etc.

Next, at operation 803, one or more modules of a computing system can access a calendaring database to determine individuals of interest. As summarized above, calendar events of a user, such as a presenter, can be analyzed to determine if a time of a particular calendar event coincides with a time of the triggering event. If one or more calendar events have a time that coincides with the time of the triggering event, the calendar events are selected as candidates. The candidates can be presented to a user. The candidates can also be ranked based on a confidence score. Based on the confidence score or based on a user selection of a particular candidate, individuals of interest can be identified.

Next, at operation 805, one or more modules of a computing system can obtain contact information for the individuals of interest. The contact information can be obtained from a selected calendar event. The contact information can also be retrieved from one or more address books or any other suitable resource.

Next, at operation 807, one or more modules of a computing device can generate a sharing recommendation. A sharing recommendation can be generated in any form, such as a voice notification, a message displayed within an application, an email message, etc. FIG. 2 illustrates one example of a sharing recommendation.

Next, at operation 809, one or more modules of a computing device can generate a message containing a link to the file or an attachment of the file. As described above, the system can populate one or more fields of the message to assist the user in sharing the file to the individuals of interest. The message can be delivered to the individuals of interest by any suitable mechanism, such as an email message, an instant message, etc. The message can also cause a recipient's applications to provide easy access to the file. For example, as shown in FIG. 7, a recently presented list can be automatically displayed within an application utilized by the recipient.

Figure 9:
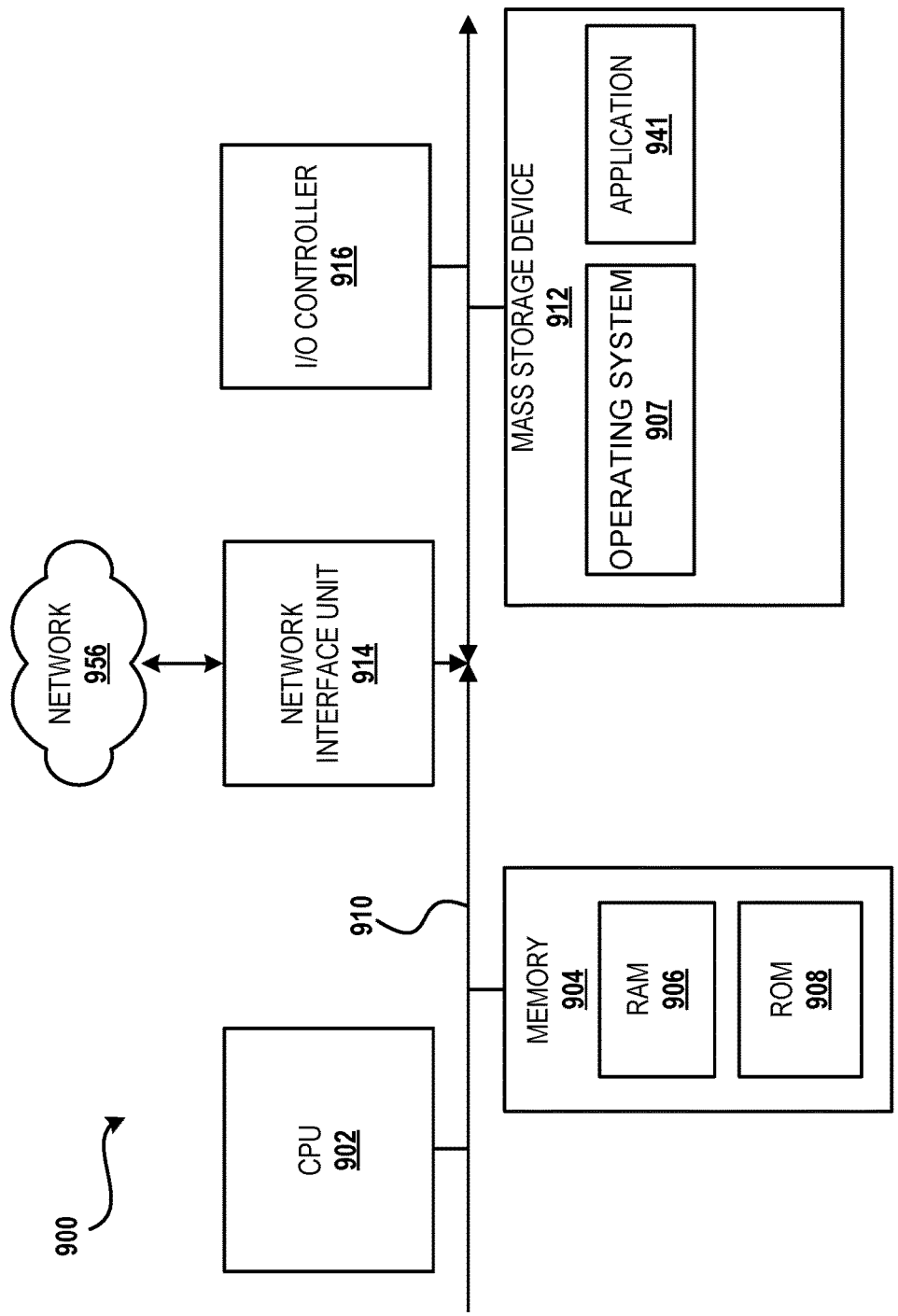
FIG. 9 is a computer architecture diagram illustrating an illustrative computer hardware and software architecture for a computing system capable of implementing aspects of the techniques and technologies presented herein.

FIG. 9 shows additional details of an example computer architecture 900 for a computer capable of executing the program components described herein. Thus, the computer architecture 900 illustrated in FIG. 9 illustrates an architecture for a server computer, a mobile phone, a PDA, a smart phone, a desktop computer, a netbook computer, a tablet computer, and/or a laptop computer. The computer architecture 900 may be utilized to execute any aspects of the software components presented herein.

The computer architecture 900 illustrated in FIG. 9 includes a central processing unit 902 ("CPU"), a system memory 904, including a random access memory 906 ("RAM") and a read-only memory ("ROM") 908, and a system bus 910 that couples the memory 904 to the CPU 902. A basic input/output system containing the basic routines that help to transfer information between elements within the computer architecture 900, such as during startup, is stored in the ROM 908. The computer architecture 900 further includes a mass storage device 912 for storing an operating system 907, other data, and one or more application programs 941, which may be a productivity application.

The mass storage device 912 is connected to the CPU 902 through a mass storage controller (not shown) connected to the bus 910. The mass storage device 912 and its associated computer-readable media provide non-volatile storage for the computer architecture 900. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes of the claims, the phrase "computer storage medium," "computer-readable storage medium" and variations thereof, does not include waves, signals, and/or other transitory and/or intangible communication media, per se.

According to various configurations, the computer architecture 900 may operate in a networked environment using logical connections to remote computers through the network 956 and/or another network (not shown). The computer architecture 900 may connect to the network 956 through a network interface unit 914 connected to the bus 910. It should be appreciated that the network interface unit 914 also may be utilized to connect to other types of networks and remote computer systems. The computer architecture 900 also may include an input/output controller 916 for receiving and processing input from a number of other devices, including a keyboard, mouse, or electronic stylus (not shown in FIG. 9). Similarly, the input/output controller 916 may provide output to a display screen, a printer, or other type of output device (also not shown in FIG. 9).

It should be appreciated that the software components described herein may, when loaded into the CPU 902 and executed, transform the CPU 902 and the overall computer architecture 900 from a general-purpose computing system into a special-purpose computing system customized to facilitate the functionality presented herein. The CPU 902 may be constructed from any number of transistors or other discrete circuit elements, which may individually or collectively assume any number of states. More specifically, the CPU 902 may operate as a finite-state machine, in response to executable instructions contained within the software modules disclosed herein. These computer-executable instructions may transform the CPU 902 by specifying how the CPU 902 transitions between states, thereby transforming the transistors or other discrete hardware elements constituting the CPU 902.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 900 in order to store and execute the software components presented herein. It also should be appreciated that the computer architecture 900 may include other types of computing devices, including hand-held computers, embedded computer systems, personal digital assistants, and other types of computing devices known to those skilled in the art. It is also contemplated that the computer architecture 900 may not include all of the components shown in FIG. 9, may include other components that are not explicitly shown in FIG. 9, or may utilize an architecture completely different than that shown in FIG. 9.

Figure 10:
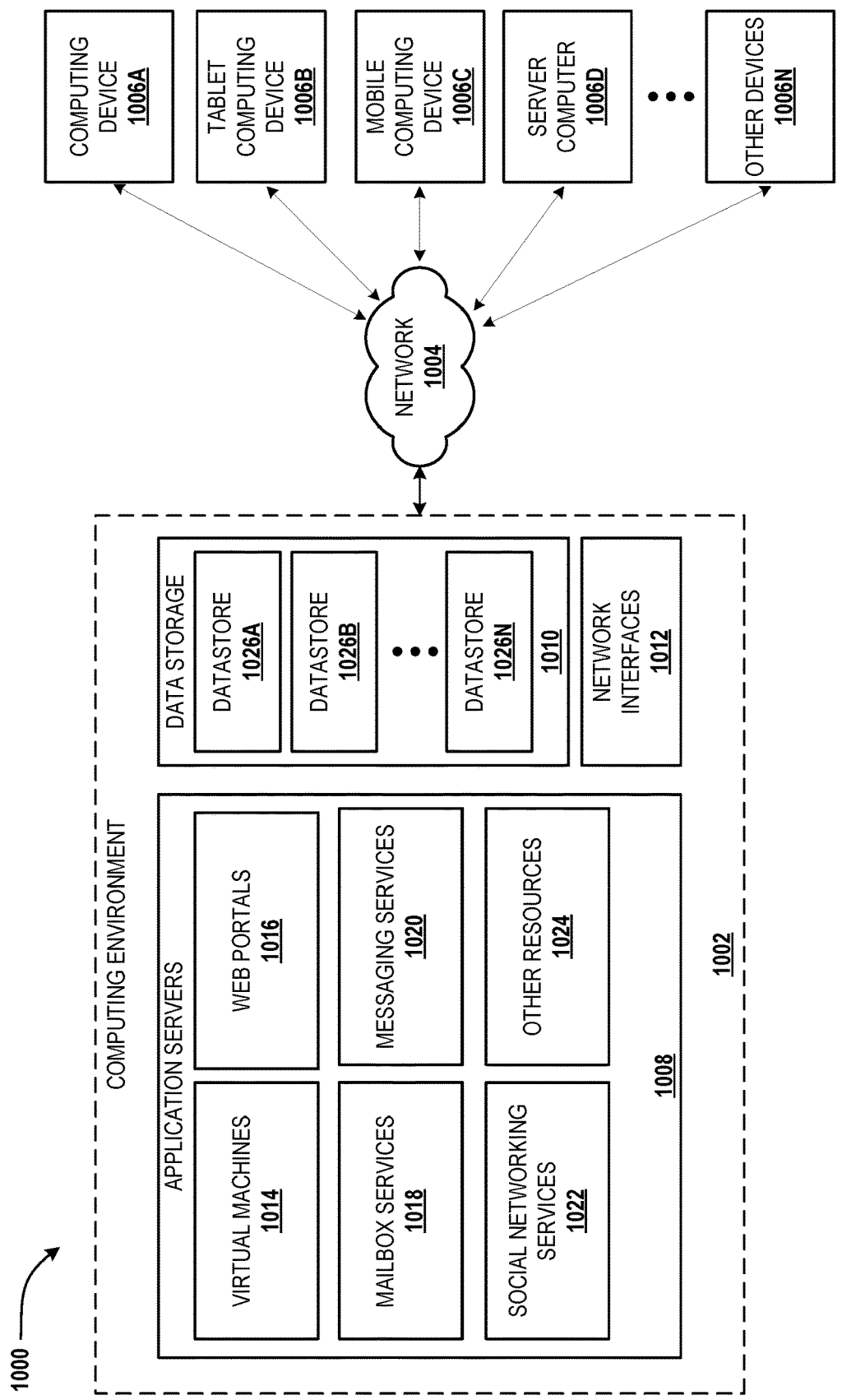
FIG. 10 is a diagram illustrating a distributed computing environment capable of implementing aspects of the techniques and technologies presented herein.

FIG. 10 depicts an illustrative distributed computing environment 1000 capable of executing the software components described herein. Thus, the distributed computing environment 1000 illustrated in FIG. 10 can be utilized to execute any aspects of the software components presented herein. For example, the distributed computing environment 1000 can be utilized to execute aspects of the software components described herein.

According to various implementations, the distributed computing environment 1000 includes a computing environment 1002 operating on, in communication with, or as part of the network 1004. The network 1004 may be or may include the network 956, described above with reference to FIG. 9. The network 1004 also can include various access networks. One or more client devices 1006A-1006N (hereinafter referred to collectively and/or generically as "clients 1006" and also referred to herein as computing devices 106) can communicate with the computing environment 1002 via the network 1004 and/or other connections (not illustrated in FIG. 10). In one illustrated configuration, the clients 1006 include a computing device 1006A such as a laptop computer, a desktop computer, or other computing device; a slate or tablet computing device ("tablet computing device") 1006B; a mobile computing device 1006C such as a mobile telephone, a smart phone, or other mobile computing device; a server computer 1006D; and/or other devices 1006N. It should be understood that any number of clients 1006 can communicate with the computing environment 1002. Two example computing architectures for the clients 1006 are illustrated and described herein with reference to FIGS. 9 and 11. It should be understood that the illustrated clients 1006 and computing architectures illustrated and described herein are illustrative, and should not be construed as being limited in any way.

In the illustrated configuration, the computing environment 1002 includes application servers 1008, data storage 1010, and one or more network interfaces 1012. According to various implementations, the functionality of the application servers 1008 can be provided by one or more server computers that are executing as part of, or in communication with, the network 1004. The application servers 1008 can host various services, virtual machines, portals, and/or other resources. In the illustrated configuration, the application servers 1008 host one or more virtual machines 1014 for hosting applications or other functionality. According to various implementations, the virtual machines 1014 host one or more applications and/or software modules for enabling the techniques disclosed herein. It should be understood that this configuration is illustrative, and should not be construed as being limiting in any way. The application servers 1008 also host or provide access to one or more portals, link pages, Web sites, and/or other information ("Web portals") 1016.

According to various implementations, the application servers 1008 also include one or more mailbox services 1018 and one or more messaging services 1020. The mailbox services 1018 can include electronic mail ("email") services. The mailbox services 1018 also can include various personal information management ("PIM") and presence services including, but not limited to, calendar services, contact management services, collaboration services, and/or other services. The messaging services 1020 can include, but are not limited to, instant messaging services, chat services, forum services, and/or other communication services.

The application servers 1008 also may include one or more social networking services 1022. The social networking services 1022 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1022 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 1022 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 1022 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 1022 are not mentioned herein for the sake of brevity. As such, the above configurations are illustrative, and should not be construed as being limited in any way. According to various implementations, the social networking services 1022 may host one or more applications and/or software modules for providing the functionality described herein, such as enabling the techniques disclosed herein. For instance, any one of the application servers 1008 may communicate or facilitate the functionality and features described herein. For instance, a social networking application, mail client, messaging client or a browser running on a phone or any other client 1006 may communicate with a networking service 1022 and facilitate the functionality, even in part, described above with respect to FIG. 10. Any device or service depicted herein can be used as a resource for supplemental data, including email servers, storage servers, etc.

As shown in FIG. 10, the application servers 1008 also can host other services, applications, portals, and/or other resources ("other resources") 1024. The other resources 1024 can include, but are not limited to, document sharing, rendering or any other functionality. It thus can be appreciated that the computing environment 1002 can provide integration of the concepts and technologies disclosed herein with various mailbox, messaging, social networking, and/or other services or resources.

As mentioned above, the computing environment 1002 can include the data storage 1010. According to various implementations, the functionality of the data storage 1010 is provided by one or more databases operating on, or in communication with, the network 1004. The functionality of the data storage 1010 also can be provided by one or more server computers configured to host data for the computing environment 1002. The data storage 1010 can include, host, or provide one or more real or virtual datastores 1026A-1026N (hereinafter referred to collectively and/or generically as "datastores 1026"). The datastores 1026 are configured to host data used or created by the application servers 1008 and/or other data. Although not illustrated in FIG. 10, the datastores 1026 also can host or store web page documents, word documents, presentation documents, data structures, algorithms for execution by a recommendation engine, and/or other data utilized by any application program or another module. Aspects of the datastores 1026 may be associated with a service for storing files.

The computing environment 1002 can communicate with, or be accessed by, the network interfaces 1012. The network interfaces 1012 can include various types of network hardware and software for supporting communications between two or more computing devices including, but not limited to, the computing devices and the servers. It should be appreciated that the network interfaces 1012 also may be utilized to connect to other types of networks and/or computer systems.

It should be understood that the distributed computing environment 1000 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1000 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1000 to utilize the functionality described herein for providing the techniques disclosed herein, among other aspects. In one specific example, as summarized above, techniques described herein may be implemented, at least in part, by web browser application, which works in conjunction with the application servers 1008 of FIG. 10.

Figure 11:
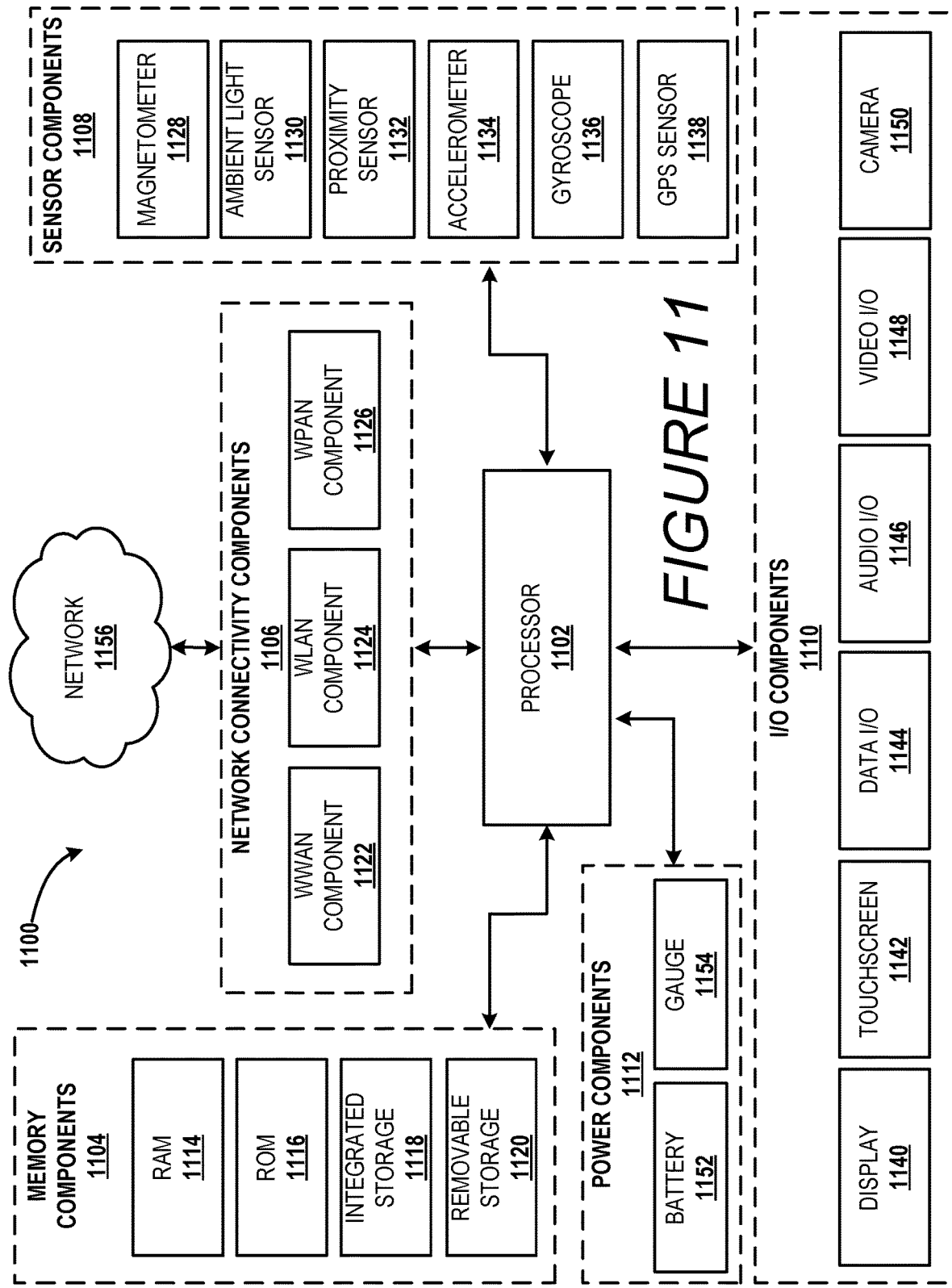
FIG. 11 is a computer architecture diagram illustrating a computing device architecture for a computing device capable of implementing aspects of the techniques and technologies presented herein.

Turning now to FIG. 11, an illustrative computing device architecture 1100 for a computing device that is capable of executing various software components described herein for enabling the techniques disclosed herein. The computing device architecture 1100 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1100 is applicable to any of the computing devices described herein. Moreover, aspects of the computing device architecture 1100 may be applicable to traditional desktop computers, portable computers (e.g., phones, laptops, notebooks, ultra-portables, and netbooks), server computers, and other computer systems, such as described herein with reference to FIG. 1 and FIG. 10. For example, the single touch and multi-touch aspects disclosed herein below may be applied to desktop computers that utilize a touchscreen or some other touch-enabled device, such as a touch-enabled track pad or touch-enabled mouse.

The computing device architecture 1100 illustrated in FIG. 11 includes a processor 1102, memory components 1104, network connectivity components 1106, sensor components 1108, input/output components 1110, and power components 1112. In the illustrated configuration, the processor 1102 is in communication with the memory components 1104, the network connectivity components 1106, the sensor components 1108, the input/output ("I/O") components 1110, and the power components 1112. Although no connections are shown between the individuals components illustrated in FIG. 11, the components can interact to carry out device functions. In some configurations, the components are arranged so as to communicate via one or more busses (not shown).

The processor 1102 includes a central processing unit ("CPU") configured to process data, execute computer-executable instructions of one or more application programs, and communicate with other components of the computing device architecture 1100 in order to perform various functionality described herein. The processor 1102 may be utilized to execute aspects of the software components presented herein and, particularly, those that utilize, at least in part, a touch-enabled input.

In some configurations, the processor 1102 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 1102 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1102 is, or is included in, a system-on-chip ("SoC") along with one or more of the other components described herein below. For example, the SoC may include the processor 1102, a GPU, one or more of the network connectivity components 1106, and one or more of the sensor components 1108. In some configurations, the processor 1102 is fabricated, in part, utilizing a package-on-package ("PoP") integrated circuit packaging technique. The processor 1102 may be a single core or multi-core processor.

The processor 1102 may be created in accordance with an ARM architecture, available for license from ARM HOLDINGS of Cambridge, United Kingdom. Alternatively, the processor 1102 may be created in accordance with an x86 architecture, such as is available from INTEL CORPORATION of Mountain View, Calif. and others. In some configurations, the processor 1102 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1104 include a random access memory ("RAM") 1114, a read-only memory ("ROM") 1116, an integrated storage memory ("integrated storage") 1118, and a removable storage memory ("removable storage") 1120. In some configurations, the RAM 1114 or a portion thereof, the ROM 1116 or a portion thereof, and/or some combination of the RAM 1114 and the ROM 1116 is integrated in the processor 1102. In some configurations, the ROM 1116 is configured to store a firmware, an operating system or a portion thereof (e.g., operating system kernel), and/or a bootloader to load an operating system kernel from the integrated storage 1118 and/or the removable storage 1120.

The integrated storage 1118 can include a solid-state memory, a hard disk, or a combination of solid-state memory and a hard disk. The integrated storage 1118 may be soldered or otherwise connected to a logic board upon which the processor 1102 and other components described herein also may be connected. As such, the integrated storage 1118 is integrated in the computing device. The integrated storage 1118 is configured to store an operating system or portions thereof, application programs, data, and other software components described herein.

The removable storage 1120 can include a solid-state memory, a hard disk, or a combination of solid-state memory and a hard disk. In some configurations, the removable storage 1120 is provided in lieu of the integrated storage 1118. In other configurations, the removable storage 1120 is provided as additional optional storage. In some configurations, the removable storage 1120 is logically combined with the integrated storage 1118 such that the total available storage is made available as a total combined storage capacity. In some configurations, the total combined capacity of the integrated storage 1118 and the removable storage 1120 is shown to a user instead of separate storage capacities for the integrated storage 1118 and the removable storage 1120.

The removable storage 1120 is configured to be inserted into a removable storage memory slot (not shown) or other mechanism by which the removable storage 1120 is inserted and secured to facilitate a connection over which the removable storage 1120 can communicate with other components of the computing device, such as the processor 1102. The removable storage 1120 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1104 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1106 include a wireless wide area network component ("WWAN component") 1122, a wireless local area network component ("WLAN component") 1124, and a wireless personal area network component ("WPAN component") 1126. The network connectivity components 1106 facilitate communications to and from the network 1156 or another network, which may be a WWAN, a WLAN, or a WPAN. Although only the network 1156 is illustrated, the network connectivity components 1106 may facilitate simultaneous communication with multiple networks, including the network 604 of FIG. 6. For example, the network connectivity components 1106 may facilitate simultaneous communications with multiple networks via one or more of a WWAN, a WLAN, or a WPAN.

The network 1156 may be or may include a WWAN, such as a mobile telecommunications network utilizing one or more mobile telecommunications technologies to provide voice and/or data services to a computing device utilizing the computing device architecture 1100 via the WWAN component 1122. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 1156 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1156 may be configured to provide voice and/or data communications with any combination of the above technologies. The network 1156 may be configured to or adapted to provide voice and/or data communications in accordance with future generation technologies.

In some configurations, the WWAN component 1122 is configured to provide dual-multi-mode connectivity to the network 1156. For example, the WWAN component 1122 may be configured to provide connectivity to the network 1156, wherein the network 1156 provides service via GSM and UMTS technologies, or via some other combination of technologies. Alternatively, multiple WWAN components 1122 may be utilized to perform such functionality, and/or provide additional functionality to support other non-compatible technologies (i.e., incapable of being supported by a single WWAN component). The WWAN component 1122 may facilitate similar connectivity to multiple networks (e.g., a UMTS network and an LTE network).

The network 1156 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 1156 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1126 is configured to facilitate communications with other devices, such as peripherals, computers, or other computing devices via the WPAN.

The sensor components 1108 include a magnetometer 1128, an ambient light sensor 1130, a proximity sensor 1132, an accelerometer 1134, a gyroscope 1136, and a Global Positioning System sensor ("GPS sensor") 1138. It is contemplated that other sensors, such as, but not limited to, temperature sensors or shock detection sensors, also may be incorporated in the computing device architecture 1100.

The magnetometer 1128 is configured to measure the strength and direction of a magnetic field. In some configurations the magnetometer 1128 provides measurements to a compass application program stored within one of the memory components 1104 in order to provide a user with accurate directions in a frame of reference including the cardinal directions, north, south, east, and west. Similar measurements may be provided to a navigation application program that includes a compass component. Other uses of measurements obtained by the magnetometer 1128 are contemplated.

The ambient light sensor 1130 is configured to measure ambient light. In some configurations, the ambient light sensor 1130 provides measurements to an application program stored within one the memory components 1104 in order to automatically adjust the brightness of a display (described below) to compensate for low-light and high-light environments. Other uses of measurements obtained by the ambient light sensor 1130 are contemplated.

The proximity sensor 1132 is configured to detect the presence of an object or thing in proximity to the computing device without direct contact. In some configurations, the proximity sensor 1132 detects the presence of a user's body (e.g., the user's face) and provides this information to an application program stored within one of the memory components 1104 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1132 are contemplated.

The accelerometer 1134 is configured to measure proper acceleration. In some configurations, output from the accelerometer 1134 is used by an application program as an input mechanism to control some functionality of the application program. For example, the application program may be a video game in which a character, a portion thereof, or an object is moved or otherwise manipulated in response to input received via the accelerometer 1134. In some configurations, output from the accelerometer 1134 is provided to an application program for use in switching between landscape and portrait modes, calculating coordinate acceleration, or detecting a fall. Other uses of the accelerometer 1134 are contemplated.

The gyroscope 1136 is configured to measure and maintain orientation. In some configurations, output from the gyroscope 1136 is used by an application program as an input mechanism to control some functionality of the application program. For example, the gyroscope 1136 can be used for accurate recognition of movement within a 3D environment of a video game application or some other application. In some configurations, an application program utilizes output from the gyroscope 1136 and the accelerometer 1134 to enhance control of some functionality of the application program. Other uses of the gyroscope 1136 are contemplated.

The GPS sensor 1138 is configured to receive signals from GPS satellites for use in calculating a location. The location calculated by the GPS sensor 1138 may be used by any application program that requires or benefits from location information. For example, the location calculated by the GPS sensor 1138 may be used with a navigation application program to provide directions from the location to a destination or directions from the destination to the location. Moreover, the GPS sensor 1138 may be used to provide location information to an external location-based service, such as E911 service. The GPS sensor 1138 may obtain location information generated via WI-FI, WIMAX, and/or cellular triangulation techniques utilizing one or more of the network connectivity components 1106 to aid the GPS sensor 1138 in obtaining a location fix. The GPS sensor 1138 may also be used in Assisted GPS ("A-GPS") systems. The GPS sensor 1138 can also operate in conjunction with other components, such as the processor 1102, to generate positioning data for the computing device 1100.

The I/O components 1110 include a display 1140, a touchscreen 1142, a data I/O interface component ("data I/O") 1144, an audio I/O interface component ("audio I/O") 1146, a video I/O interface component ("video I/O") 1148, and a camera 1150. In some configurations, the display 1140 and the touchscreen 1142 are combined. In some configurations two or more of the data I/O component 1144, the audio I/O component 1146, and the video I/O component 1148 are combined. The I/O components 1110 may include discrete processors configured to support the various interface described below, or may include processing functionality built-in to the processor 1102.

The display 1140 is an output device configured to present information in a visual form. In particular, the display 1140 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1140 is a liquid crystal display ("LCD") utilizing any active or passive matrix technology and any backlighting technology (if used). In some configurations, the display 1140 is an organic light emitting diode ("OLED") display. Other display types are contemplated.

The touchscreen 1142, also referred to herein as a "touch-enabled screen," is an input device configured to detect the presence and location of a touch. The touchscreen 1142 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1142 is incorporated on top of the display 1140 as a transparent layer to enable a user to use one or more touches to interact with objects or other information presented on the display 1140. In other configurations, the touchscreen 1142 is a touch pad incorporated on a surface of the computing device that does not include the display 1140. For example, the computing device may have a touchscreen incorporated on top of the display 1140 and a touch pad on a surface opposite the display 1140.

In some configurations, the touchscreen 1142 is a single-touch touchscreen. In other configurations, the touchscreen 1142 is a multi-touch touchscreen. In some configurations, the touchscreen 1142 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1142. As such, a developer may create gestures that are specific to a particular application program.

In some configurations, the touchscreen 1142 supports a tap gesture in which a user taps the touchscreen 1142 once on an item presented on the display 1140. The tap gesture may be used for various reasons including, but not limited to, opening or launching whatever the user taps. In some configurations, the touchscreen 1142 supports a double tap gesture in which a user taps the touchscreen 1142 twice on an item presented on the display 1140. The double tap gesture may be used for various reasons including, but not limited to, zooming in or zooming out in stages. In some configurations, the touchscreen 1142 supports a tap and hold gesture in which a user taps the touchscreen 1142 and maintains contact for at least a pre-defined time. The tap and hold gesture may be used for various reasons including, but not limited to, opening a context-specific menu.

In some configurations, the touchscreen 1142 supports a pan gesture in which a user places a finger on the touchscreen 1142 and maintains contact with the touchscreen 1142 while moving the finger on the touchscreen 1142. The pan gesture may be used for various reasons including, but not limited to, moving through screens, images, or menus at a controlled rate. Multiple finger pan gestures are also contemplated. In some configurations, the touchscreen 1142 supports a flick gesture in which a user swipes a finger in the direction the user wants the screen to move. The flick gesture may be used for various reasons including, but not limited to, scrolling horizontally or vertically through menus or pages. In some configurations, the touchscreen 1142 supports a pinch and stretch gesture in which a user makes a pinching motion with two fingers (e.g., thumb and forefinger) on the touchscreen 1142 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 1142. As such, the above gestures should be understood as being illustrative and should not be construed as being limiting in any way.

The data I/O interface component 1144 is configured to facilitate input of data to the computing device and output of data from the computing device. In some configurations, the data I/O interface component 1144 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1146 is configured to provide audio input and/or output capabilities to the computing device. In some configurations, the audio I/O interface component 1146 includes a microphone configured to collect audio signals. In some configurations, the audio I/O interface component 1146 includes a headphone jack configured to provide connectivity for headphones or other external speakers. In some configurations, the audio I/O interface component 1146 includes a speaker for the output of audio signals. In some configurations, the audio I/O interface component 1146 includes an optical audio cable out.

The video I/O interface component 1148 is configured to provide video input and/or output capabilities to the computing device. In some configurations, the video I/O interface component 1148 includes a video connector configured to receive video as input from another device (e.g., a video media player such as a DVD or BLURAY player) or send video as output to another device (e.g., a monitor, a television, or some other external display). In some configurations, the video I/O interface component 1148 includes a High-Definition Multimedia Interface ("HDMI"), mini-HDMI, micro-HDMI, DisplayPort, or proprietary connector to input/output video content. In some configurations, the video I/O interface component 1148 or portions thereof is combined with the audio I/O interface component 1146 or portions thereof.

The camera 1150 can be configured to capture still images and/or video. The camera 1150 may utilize a charge coupled device ("CCD") or a complementary metal oxide semiconductor ("CMOS") image sensor to capture images. In some configurations, the camera 1150 includes a flash to aid in taking pictures in low-light environments. Settings for the camera 1150 may be implemented as hardware or software buttons.

Although not illustrated, one or more hardware buttons may also be included in the computing device architecture 1100. The hardware buttons may be used for controlling some operational aspect of the computing device. The hardware buttons may be dedicated buttons or multi-use buttons. The hardware buttons may be mechanical or sensor-based.

The illustrated power components 1112 include one or more batteries 1152, which can be connected to a battery gauge 1154. The batteries 1152 may be rechargeable or disposable. Rechargeable battery types include, but are not limited to, lithium polymer, lithium ion, nickel cadmium, and nickel metal hydride. Each of the batteries 1152 may be made of one or more cells.

The battery gauge 1154 can be configured to measure battery parameters such as current, voltage, and temperature. In some configurations, the battery gauge 1154 is configured to measure the effect of a battery's discharge rate, temperature, age and other factors to predict remaining life within a certain percentage of error. In some configurations, the battery gauge 1154 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1112 may also include a power connector, which may be combined with one or more of the aforementioned I/O components 1110. The power components 1112 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for influencing collaboration for a group of users, the method comprising:
   detecting that a file is presented to the group of users from an ancillary display device;
   in response to detecting that the file is presented to the group of users, detecting a triggering event associated with the file, wherein the triggering event is receiving a deactivation of the ancillary display device which is displaying the file to at least one attendee of attendees of a calendar event or at least one user of the users associated with a communication session associated with the group of users;
   causing accessing a data resource to select the calendar event or the communication session having a date and a time associated with a time of the triggering event;
   obtaining contact information of one or more of the attendees of the calendar event or the communication session;
   generating a recommendation to share the file, where in the recommendation includes a description of the triggering event;
   generating a message containing a link to the file or an attachment of the file, the message configured with a list of recipients that is based on the attendees of the calendar event or the users associated with the communication session; and
   delivering the message to the recipients utilizing the contact information.

2. The method of claim 1, further comprising:
   uploading the file to a remote storage service; and
   causing the remote storage service to generate the link enabling access to the file stored at the remote storage service.

3. The method of claim 1, wherein the triggering event further comprises at least one of a transition from a presentation mode to an editing mode of an application accessing the file or the transition from the editing mode to presentation mode of the application accessing the file.

4. The method of claim 1, wherein the triggering event further includes detecting a conclusion of a multi-user editing session of the file.

5. The method of claim 1, wherein the triggering event further includes detecting a conferencing screen share session of contents of the file.

6. A system comprising:
   one or more central processing units; and
   a computer-readable storage medium having encoded thereon computer-executable instructions to cause the one or more processing units to execute a method comprising
   detecting that a file is presented from an ancillary display device;
   in response to detecting that the file is presented to the group of users, detecting a triggering event associated with the file, wherein the triggering event is receiving a deactivation of the ancillary display device which is displaying the file to at least one invitee of invitees listed in an event;
   causing accessing a database to select the event having a date and a time associated with a time of the triggering event;
     obtaining contact information of the at least one invitee of the invitees listed in the event;
     generating a message containing a link to the file, the message configured with a list of recipients that is based on the contact information; and
     delivering the message to the recipients to encourage collaboration on the file.

7. The system of claim 6, wherein the computer-executable instructions further cause the one or more central processing units to upload the file to a remote storage service and causing the remote storage service to generate the link enabling access to the file stored at the remote storage service.

8. The system of claim 6, wherein the triggering event further comprises a transition from a presentation mode to an editing mode of an application accessing the file.

9. The system of claim 6, wherein the triggering event further comprises a transition from an editing mode to a presentation mode of an application accessing the file.

10. The system of claim 6, wherein the triggering event further includes at least one of detecting a presentation of content of the file on the ancillary display device or detecting a multi-user editing session of the file.

11. The system of claim 6, wherein the triggering event further includes detecting a conclusion of a multi-user editing session of the file.

12. The system of claim 6, wherein the triggering event further includes detecting a conferencing screen share session of contents of the file.

13. The system of claim 6, wherein the message causes an application associated with a recipient of the message to display a list of recently presented files, wherein the list comprises a name or reference to the file.

14. A computer-readable storage medium having encoded thereon computer-executable instructions causing one or more central processing units of a computing device to execute a method comprising:
   detecting that a file is presented from an ancillary display device;
   in response to detecting that the file is presented to the group of users, detecting a triggering event associated with the file, wherein the triggering event is receiving a deactivation of the ancillary display device which is displaying the file to at least one invitee of invitees listed in a calendar event;
   accessing a calendaring database to select the calendar event having a date and a time associated with a time of the triggering event;
   obtaining contact information of one or more of the invitees listed in the calendar event;
   generating a message containing a link to the file, the message configured with a list of recipients that is based on the contact information; and
   receiving a confirmation from the user to send the message and in response to receiving the confirmation, delivering the message to the recipients to encourage collaboration on the file.

15. The computer-readable storage medium of claim 14, wherein the computer-executable instructions further cause the one or more central processing units to:

determine that the file is stored on the computing device differs than a version of the file stored at a remote storage service;

in response to determining that the file is stored on the computing device differs than the version of the file stored at the remote storage service, upload the file to the remote storage service; and cause the remote storage service to generate the link enabling access to the file stored at the remote storage service.

16. The computer-readable storage medium of claim 14, wherein the triggering event further comprises a transition from a presentation mode to an editing mode of an application accessing the file.

17. The method of claim 1, wherein the ancillary display device is a projection device.

18. The method of claim 14, further comprising:

in response to the triggering event, automatically generating a notification asking a user if the user would like the file delivered to a list of recipients;

in response to the user, generating the message containing the link to the file, the message configured with the list of recipients that is based on the contact information.

19. The method of claim 1, wherein the recommendation is generated in response to the triggering event.

20. The method of claim 1, wherein generating the message including at least a portion of the recommendation containing the link to the file or an attachment of the file that is displayed on the display device.

\* \* \* \* \*